United States Patent [19]

Durbin

[11] Patent Number: 4,658,130

[45] Date of Patent: Apr. 14, 1987

[54] FIBER OPTIC SWIVEL COUPLER AND METHOD OF USE THEREFOR

[76] Inventor: John R. Durbin, 317 Kimberly, St. Peters, Mo. 63376

[21] Appl. No.: 714,964

[22] Filed: Mar. 22, 1985

[51] Int. Cl.$^4$ ............................ H01J 5/16; G02B 6/42
[52] U.S. Cl. .................................... 250/227; 350/96.2
[58] Field of Search ............... 250/551, 227; 350/96.2, 350/96.21, 96.22; 242/86; 137/355.12, 798, 799; 455/602, 610, 612

[56] References Cited

U.S. PATENT DOCUMENTS

| | | | |
|---|---|---|---|
| 4,124,272 | 11/1978 | Henderson et al. | 350/96.21 |
| 4,146,300 | 3/1979 | Kaiser | 350/96.21 |
| 4,373,779 | 2/1983 | Dorsey | 350/96.21 |
| 4,472,052 | 9/1984 | Löfgren | 350/96.2 |

FOREIGN PATENT DOCUMENTS 2085403  4/1982  United Kingdom .................. 242/86

Primary Examiner—David C. Nelms
Assistant Examiner—S. Allen
Attorney, Agent, or Firm—Edward R. Weber

[57] ABSTRACT

A control system for derricks, cranes, and the like consisting of a remote control box, fiber optic cable, reel, tubular connector, tube, swivel coupler, and terminal box which allows instructions for controlling the functional device to be sent from a location remote to the functional device via a light conducting element to a terminal box within a control center situated on the body of a truck, etc. on which said functional device is mounted.

15 Claims, 5 Drawing Figures

FIBER OPTIC SWIVEL COUPLER AND METHOD OF USE THEREFOR

FIELD OF THE INVENTION

The present invention relates generally to control systems for derricks, cranes, and the like. In particular, it relates to an improvement in the systems whereby control instructions are transmitted over fiber optic cables from a remote location to a control center on the body of the truck and thence to the mechanisms which operate the derrick, crane, etc.

BACKGROUND OF THE INVENTION

It is known that movement of a derrick, crane, and the like can be controlled from a location remote from the control center situated on the body of a truck, or other movable base on which a derrick, crane or other functional device is mounted. This method has been used to improve the efficiency of the operator in effectively manipulating the functional device. Such remote operation necessitates special procedures whereby the operator is protected from electrical current encountered if the derrick, or other portion of the truck inadvertently comes into contact with high tension wires or other sources of electrical energy.

Likewise it is known to use fiber optic cables to transmit instructions from a remote controller to the control center situated on the body of a truck and ultimately to the derrick or other functional device. Fiber optic cables overcome the disadvantages presented by bulkier hydraulic and electrical lines in that they are more flexible and are nonconducting.

Unfortunately the worker handling the fiber optic cables of a remote controller has, up to now, been faced with the problem of how to store the fiber optic cable between uses in such a way that damage is not done to the cable thereby causing a breakdown in the control system and a resultant shutdown of the derrick, crane, etc. for repairs. It is therefore an object of this invention to provide a convenient method of safely storing the fiber optic cable between uses. A further object of this invention is to provide a means whereby the fiber optic cable can be rolled and unrolled easily and conveniently in the field without damage to the cable. Other objects and features will be in part apparent and in part pointed out hereinafter.

The invention accordingly comprises the constructions and methods hereinafter described, the scope of the invention being indicated in the following claims.

SUMMARY OF THE INVENTION

The present invention is designed to provide for a control system for functional devices, such as derricks, cranes, and the like, which an operator can use from a location remote to the device, thereby protecting him from inadvertently coming into contact with high tension wires or other sources of electrical energy and which will allow him to operate the control system reliably so that instructions sent from the remote location will not be interrupted by breaks, etc. in the fiber optic cable and consequently not transmitted to the functional device.

The instructions relating to the movement of the functional device are sent from a control unit and move along a fiber optic cable through a light conducting element contained therein to a terminal box which transmits those instructions electrically to the functional device. The control unit, located at one end of the fiber optic cable, can be moved to any position required by the particular situation by rolling and unrolling of sufficient lengths of the fiber optic cable from a reel located at the control center situated on the body of a truck on which the functional device is mounted. The other end of the fiber optic cable leaves the reel and is attached to a swivel coupler, which is electrically connected to the control device located in the terminal box.

The fiber optic swivel coupler of the present invention consists of a swivel body, a coupling nut, and a terminating ferrule.

As used, the light conducting element within the protective sheath is coaxially surrounded by a tube which provides additional protection for the element and sheath and prevents undue flexing at the point where they meet the terminating ferrule. The terminating ferrule allows the light conducting element to pass through it longitudinally. The element then terminates into a globule which has been formed by application of heat to the light conducting element. The terminating ferrule is shaped in such a manner that the end adjacent to the tube is cylindrical and sized to approximately correspond with the interior diameter of said tube. The terminating ferrule is crimped, bonded or otherwise firmly affixed to said tube and the fiber optic cable passing therethrough. The cylindrical shape of the ferrule extends mid-way along the length of the ferrule to a shoulder. Immediately past the shoulder, the ferrule tapers to a decreased diameter at the free end. The terminating ferrule co-acts with a coupling nut at said shoulder in such manner that the ferrule may rotate freely within the nut. The coupling nut is then mated via a threaded arrangement with a swivel body. The swivel body has a base designed for mounting the swivel body to a support structure. The base reduces via a circular shoulder to form a male threaded circular shape which is internally tapered to mate with the terminating ferrule when the coupling nut is in threaded engagement with the swivel body. A lens is situated within said swivel body such that it will be correlatively aligned with the globule formed at the end of the terminating ferrule when the swivel body and coupling nut are in threaded engagement. The lens transmits the light received from the light conducting element to a light responsive device mounted within the swivel body which in turn is connected to the controls which operate the derrick, crane or other such device. When assembled, the swivel coupler has a light coupling efficiency of less than 3 dB loss between the light conducting element and the light responsive device. As compared to a fixed coupler of similar complexity, the difference in coupling efficiency is insignificant.

In use in the field, an operator can roll and unroll the fiber optic cable with a minimum of fuss because the fiber optic swivel coupler of the present invention allows the cable housing the light conducting element to rotate freely without twisting or otherwise damaging the element or interrupting the transmission of light between the control unit and the terminal box.

DETAILED DESCRIPTION OF THE DRAWINGS

Figure 1:
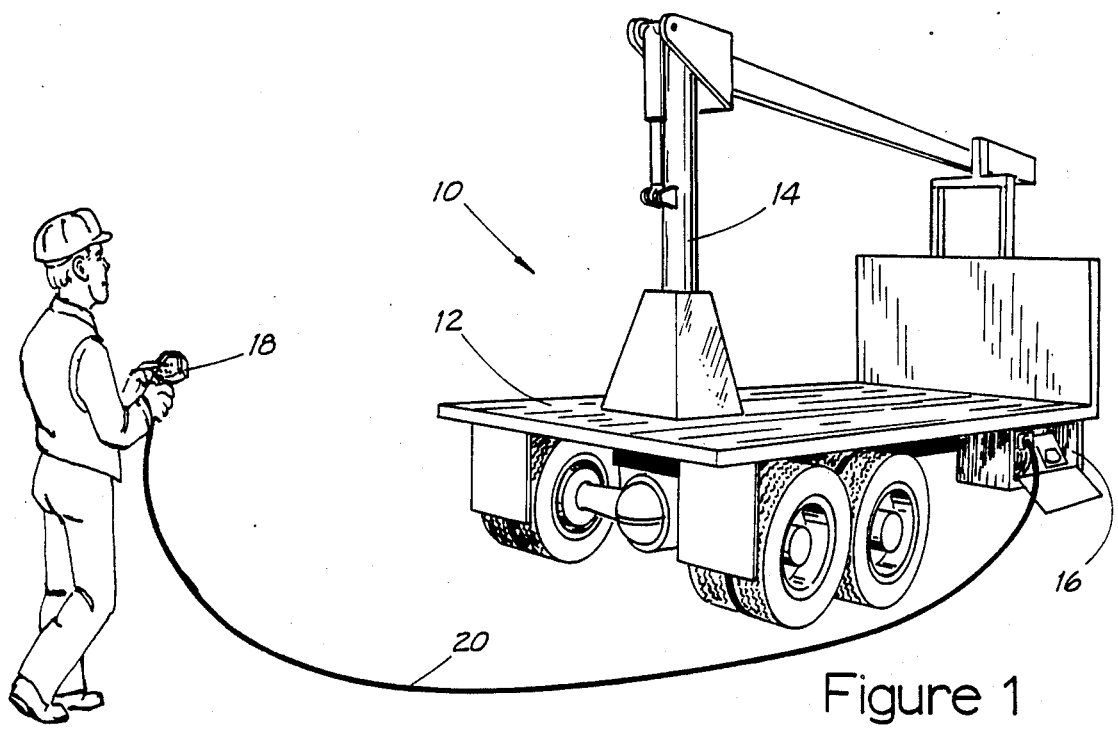
FIG. 1 is a pictorial view of a power boom truck equipped for control from a remote location on which the present invention is installed.

Corresponding reference characters indicate corresponding parts throughout the several views of the diagrams. In the accompanying drawings, in which one of various possible embodiments of the invention is illustrated, numeral 10 designates a vehicle mounting a device for carrying out loading or unloading operations, or functioning as a derrick, a crane, or the like. It includes a vehicle body 12, a functional device 14, a control box 16, a remote transmitting control unit 18 adapted to be operated by a workman at a location remote from the body of the truck, and a flexible fiber optic cable 20 of a conventional type adapted to carry light signals from remote transmitting control unit 18 to control box 16.

Figure 2:
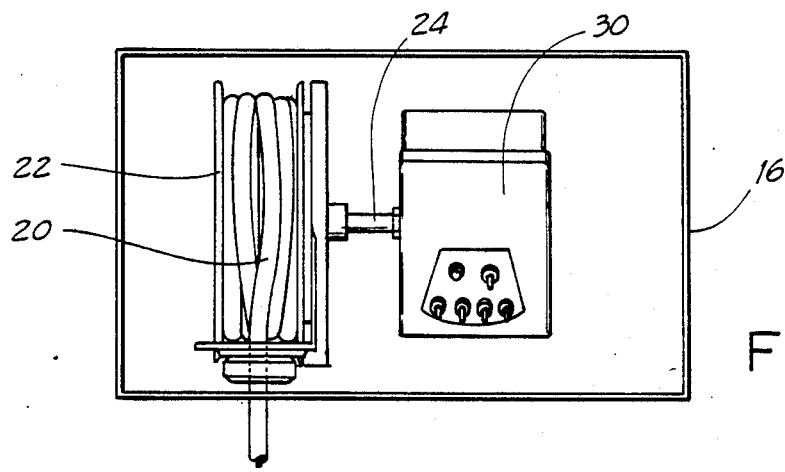
FIG. 2 is a close-up view of the reel system showing in detail the reel and the terminal box.
Figure 2A:
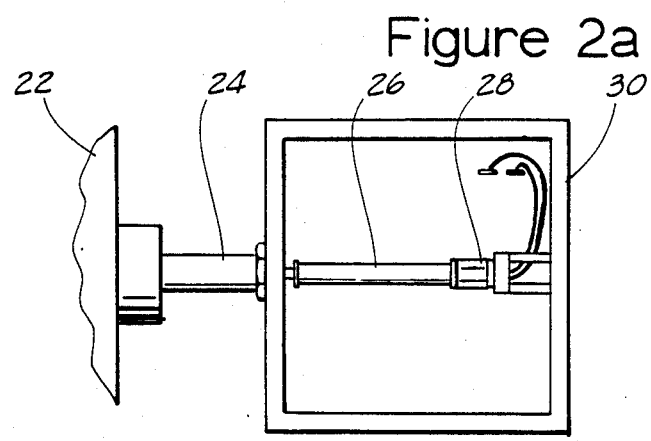
FIG. 2A is an enlarged view of a portion of FIG. 2 with the cover of the terminal box removed.

FIGS. 2 and 2A present a larger view of control box 16, showing fiber optic cable 20, reel 22, terminal box 30, tubular connector 24, tube 26, and swivel coupler 28, respectively. In operation, the end of fiber optic cable 20 which is not attached to control unit 18 passes through a suitable port, not shown, in reel 22, and through the interior of tubular connector 24 into the interior of terminal box 30. The fiber optic cable 20 when passing through tubular connector 24, is unrestricted in its ability to move and to rotate within tubular connector 24. Tube 26 is placed around fiber optic cable 20 to provide protection and to prevent undue flexing at the connection to swivel coupler 28. Tube 26 rotates with fiber optic cable 20 as a single unitary piece.

Figure 3:
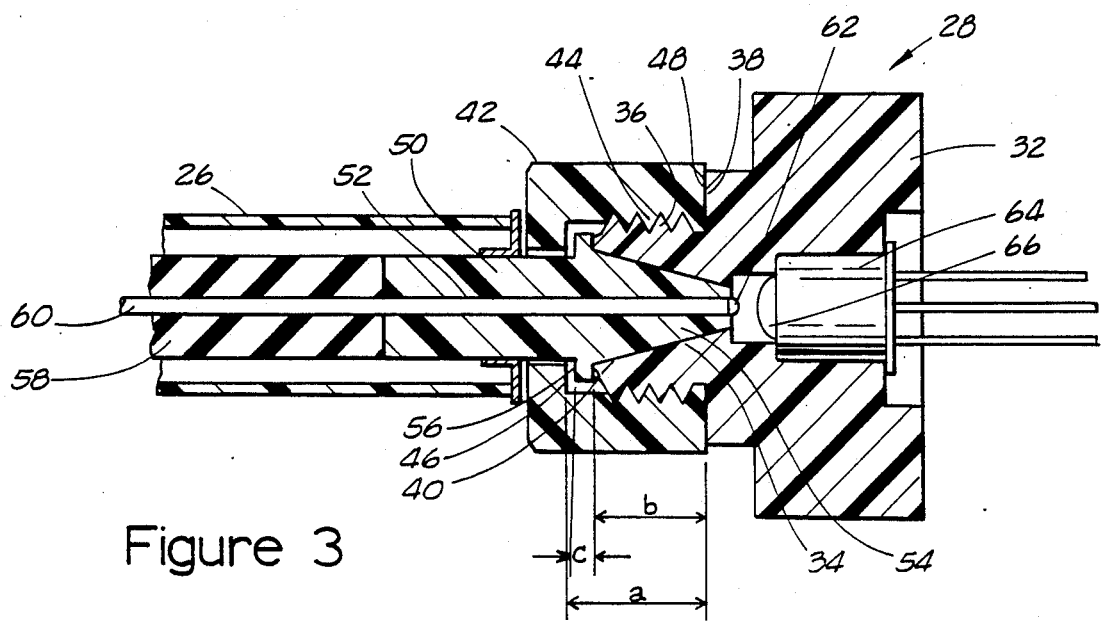
FIG. 3 is a sectional view of the swivel device of the present invention.
Figure 4:
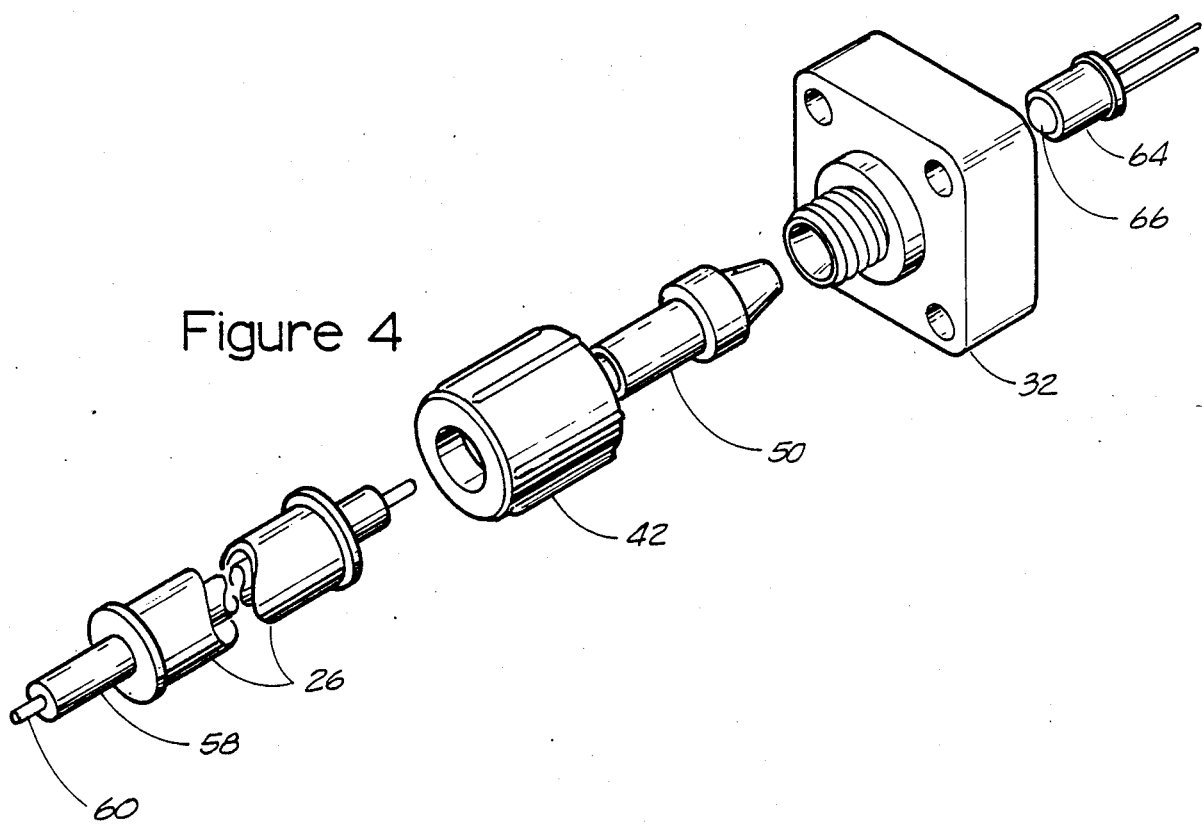
FIG. 4 is an exploded view of the swivel device of the present invention.

As shown in FIGS. 3 and 4, swivel coupler 28 consists of swivel body 32, a coupling nut 42, a terminating ferrule 50, and a light responsive device 64. Terminating ferrule 50 is fundamentally a body of revolution having a hole 52 passing longitudinally down the central axis thereof. One end of terminating ferrule 50 has a taper 54 of increasing diameter from the end to near the mid-point of the ferrule. Taper 54 mates with a similar taper 34 in swivel body 32, the exact dimensions and configurations of the tapers being immaterial so long as ferrule 50 and swivel body 32 freely fit together and ferrule 50 can be readily rotated around its longitudinal axis while mated with swivel body 32. Where taper 54 terminates near the mid-point of ferrule 50, there is a shoulder 56. This shoulder has the dual function of controlling the distance that ferrule 50 is inserted into swivel body 32 and of serving to facilitate retention of ferrule 50 in swivel body 32 by coupling nut 42. Coupling nut 42 is provided with female threads 44, which mate with male threads 36 on swivel body 32. Light responsive device 64 having a light receiving lens 66 is mounted in swivel body 32.

In assembly, fiber optic cable 20, consisting of protective sheath 58 and light conducting element 60, is assembled with ferrule 50 so that light conducting element 60 passes completely through ferrule 50. Ferrule 50 may be permanently affixed to fiber optic cable 20 by any of a number of means, including bonding and crimping. The free end of the light conducting element 60 passes completely through the tapered end of ferrule 50. After the assembly is completed, this free end is heated so as to form a slight globule 62 of light conducting material. This globule 62 serves to focus the light passing through the light conducting element 60 on to the surface of light receiving lens 66 of light responsive device 64. Coupling nut 42 is dimensioned so that "a", the measurement from coupling nut face 48 to the inside surface of coupling nut shoulder 46, is slightly greater than the sum of dimension "b" and dimension "c". Dimension "b" is the distance from surface 38 to end 40 of swivel body 32. Distance "c" is the thickness of shoulder 56 of ferrule 50. The relationship of dimensions "a", "b", and "c" is such that when coupling nut 42 is tightened on swivel body 32, nut face 46 will engage swivel body surface 38 without clamping shoulder 56 of ferrule 50 between end 40 of swivel body 32 and shoulder 46 of coupling nut 42. Thus, when coupling nut 42 is tightened, taper 54 of ferrule 50 will engage swivel body 32 along body taper 34. It will be restrained from lateral movement by the fact that ferrule shoulder 56 is held between end 40 of swivel body 32 and shoulder 46 of coupling nut 42. However, since no clamping force is applied to shoulder 56 by coupling nut 42, ferrule 50 will be freely capable of rotation with respect to swivel body 32 and coupling nut 42.

Thus, it will be seen that when the operator wishes to control the operation of functional device 14 from a position remote from control box 16, he removes control unit 18 from control box 16, unreels a sufficient length of fiber optic cable 20 from reel 22, and positions himself wherever necessary to properly operate functional device 14. As he unrolls fiber optic cable 20, reel 22 revolves about tubular connector 24. Fiber optic cable 20 is free to rotate with reel 22 as it passes through tubular connector 24. Tube 26 and ferrule 50 are fixed to the end of fiber optic cable 20 and are likewise free to rotate as reel 22 rotates. As has been previously described, ferrule 50 is free to rotate within swivel body 32. Thus, a swiveling action is provided which permits rolling and unrolling of fiber optic cable 20 on reel 22 without causing any twisting action on fiber optic cable 20. Globule 62 formed on the end of light conducting element 60 retains its same relative position with respect to light receiving lens 66 of light responsive device 64 thus assuring that a light signal transmitted through fiber optic cable 20 is properly communicated to light responsive device 64. The transmitted control signals are converted by light responsive device 64 to electrical impulses which operate the controls which direct the movement of functional device 14.

As will be fully appreciated, the aforementioned description is merely one of many possible useful embodiments of swivel coupler 28. The coupler will prove useful in many other applications where the need for rotation around the longitudinal axis of the fiber optic cable exists. Likewise, light responsive device 64 could be replaced with any number of other devices conventionally used to receive or initiate signals in combination with a fiber optic cable. In particular, light responsive device 64 could be replaced with a light emitting device and thus initiate signals at swivel coupler 28 to be transmitted by fiber optic cable 20. Selection of materials of construction for the several components is well within the skills of those working in the art. No unusual physical requirements exist and any various known materials can be used for fabrication of the various components of the device.

In view of the above, it will be seen that the several objects of the invention are achieved and other advantageous results attained.

As various changes could be made in the above constructions and methods without departing from the scope of the invention, it is intended that all matter contained in the above description or shown in the accompanying drawings shall be interpreted as illustrative and not in a limiting sense.

What is claimed is:

1. A control system in combination with a movable assembly mounted on a transportable base and having a functional device movable throughout a plurality of positions; said control system comprising a portable control unit adapted to be operated at a location removed a distance from said movable assembly; said portable control unit having at least one light generating device for producing a light beam, said control unit having means for controlling and varying the characteristics of the light in said light beam in a predetermined manner; said control system having a flexible, non-electrically conducting light transfer path means for transmitting said light beam from said control unit to a control box on said movable assembly, and a light responsive means at said control box for sensing the variations in said light beam and producing an electrical response to the variations of said light beam, the electrical response varying in accordance with variations in the characteristics of the light from said control unit; said control system including a variable response drive means communicating with said light responsive means and said movable assembly for operating said movable assembly throughout said plurality of positions in response to the variable electrical response produced by said light responsive means; said control system further including a reel device, having a central axis, mounted in proximity to said control box; said reel device being adapted to have said flexible, non-electrically conducting light transfer path wound thereon for storage; said reel device being further adapted to easily dispense and receive said flexible light transfer path by rotating on its central axis; one end of said flexible light transfer path being connected to said control box by a swivel coupler; which coupler consists of a swivel body affixed to the control box, said aforementioned light responsive device being mounted in said swivel body; a terminating ferrule surrounding said flexible light transfer path; and a coupling nut, which coupling nut serves to retain said terminating ferrule in mating relationship with said swivel body, whereby said terminating ferrule and said flexible light transfer path are free to rotate as a unit about the longitudinal axis of said flexible light transfer path and whereby the end of said flexible light transfer path is maintained in a uniform light emitting relationship to said light responsive device.

2. A control system in combination with a device for moving objects mounted on a vehicle body having a remotely controlled movable beam assembly adapted to be moved to a plurality of positions by control means connected to the vehicle body; said control means including a light source and control switches to vary the intensity of the light output of said light source; said control means being adapted to be hand held as a unit at a distance from said vehicle body; flexible light conduction means connecting said control means to light receiving means on said vehicle body; said light receiving means converting the light received from the light conducting means into electrical signals in accordance with the varying intensity of light output of the light source so as to cause the beam assembly to move from one position into another position; said control system further including a reel device, having a central axis, mounted in proximity to a control box; said reel device being adapted to have said flexible light conduction means wound thereon for storage; said reel device being further adapted to easily dispense and receive said flexible light conduction means by rotating on its central axis; one end of said flexible light conduction means being connected to said control box by a swivel coupler, which coupler consists of a swivel body affixed to said control box, said aforementioned light receiving means being mounted in said swivel body; a terminating ferrule surrounding said flexible light conduction means; and a coupling nut, which coupling nut serves to retain said terminating ferrule in mating relationship with said swivel body, whereby said terminating ferrule and said flexible light conduction means are free to rotate as a unit about the longitudinal axis of said flexible light conduction means and whereby the end of said flexible light conduction means is maintained in a uniform light emitting relationship to said light receiving means.

3. A control system according to claim 2 in which said flexible light conduction means is an fiber optic cable providing a continuous path for transmission of light from said light source to said light receiving means.

4. A control system for a crane comprising a hand held portable device for generating light signals and a receiver having a light responsive means for receiving said light signals; said portable device being adapted to be placed at a distance from said crane; said receiver being adapted to be placed adjacent to said crane; said portable device and said receiver being connected by a fiber optic cable; said light signals generated by said portable device being conducted through said fiber optic cable to said receiver wherein the light signals are detected and converted to electrical signals, which electrical signals control the movement of the crane; said control system further including a reel device, having a central axis, mounted in proximity to said receiver; said reel device being adapted to have said fiber optic cable wound thereon for storage; said reel device being further adapted to easily dispense and receive said fiber optic cable by rotating on its central axis; one end of said fiber optic cable being connected to said receiver by a swivel coupler; which coupler consists of a swivel body affixed to said receiver, said aforementioned light responsive means being mounted in said swivel body; a terminating ferrule surrounding said fiber optic cable; and a coupling nut, which coupling nut serves to retain said terminating ferrule in mating relationship with said swivel body, whereby said terminating ferrule and said fiber optic cable are free to rotate as a unit about the longitudinal axis of said fiber optic cable and whereby the end of said fiber optic cable is maintained in a uniform light emitting relationship to said light responsive means.

5. A crane according to claim 4 in which said fiber optic cable is formed of non-conductive material to prevent electricity flowing therethrough.

6. A reel device having a cylindrical body and a central axis; a flexible, non-electrically conducting light transfer path wound on said reel device for storage; said reel device being adapted to rotate about its central axis to easily dispense and receive said flexible, non-electrically conducting light transfer path; one end of said flexible, non-electrically conducting light transfer path being connected to a non-rotating surface in spaced relationship with said reel device by means of a swivel coupler, which swivel coupler consists of a swivel body affixed to said non-rotating surface, a terminating ferrule surrounding said flexible, non-electrically conducting light transfer path, and a coupling nut, which coupling nut serves to retain said terminating ferrule in mating relationship with said swivel body, whereby said terminating ferrule and said flexible, non-electrically conducting light transfer path are free to rotate as a unit about the longitudinal axis of said flexible, non-electrically conducting light transfer path and whereby the end of said flexible, non-electrically conducting light transfer path is maintained in a uniform light emitting relationship to said swivel body.

7. A swivel device adapted for use with an elongated, flexible light transfer path consisting of a swivel body adapted to contain a light generating or light responsive means, terminating ferrule adapted to surround one end of said elongated, flexible light transfer path, said terminating ferrule being adapted to mate with said swivel body in a manner which permits it to freely rotate as a unit with said elongated, flexible light transfer path about the elongated axis of said elongated, flexible light transfer path, and a coupling nut which engages said swivel body in threaded relationship so as to retain said terminating ferrule in mating relationship with said swivel body without restricting the freedom of said elongated, flexible light transfer path and said terminating ferrule to rotate about said elongated axis of said elongated, flexible light transfer path.

8. A swivel device according to claim 7 in combination with an elongated, flexible light transfer path having a light responsive device mounted within said swivel device in light receiving relationship with the end of said elongated, flexible light transfer path surrounded by said terminating ferrule, whereby light signals conducted along said elongated, flexible light transfer path are received by said light responsive device.

9. A swivel device according to claim 7 in combination with an elongated, flexible light transfer path having a light generating device mounted within said swivel device in light communicating relationship with the end of said elongated, flexible light transfer path surrounded by said terminating ferrule, whereby light signals generated by said light generating device are received by said elongated, flexible light transfer path and are transmitted thereon.

10. A reel device having a cylindrical body and a central axis; a flexible, non-electrically conducting light transfer path consisting of a fiber optic cable providing a continuous path for transmission of light wound on said reel device for storage; said reel device being adapted to rotate about its central axis to easily dispense and receive said flexible, non-electrically conducting light transfer path; one end of said flexible, non-electrically conducting light transfer path being connected to a non-rotating surface in spaced relationship with said reel device by means of a swivel coupler, which swivel coupler consists of a swivel body affixed to said non-rotating surface, a terminating ferrule surrounding said flexible, non-electrically conducting light transfer path, and a coupling nut, which coupling nut serves to retain said terminating ferrule in mating relationship with said swivel body, whereby said terminating ferrule and said flexible, non-electrically conducting light transfer path are free to rotate as a unit about the longitudinal axis of said flexible, non-electrically conducting light transfer path and whereby the end of said flexible, non-electrically conducting light transfer path is maintained in a uniform light emitting relationship to said swivel body.

11. A reel device having a cylindrical body and a central axis; a flexible, non-electrically conducting light transfer path wound on said reel device for storage; said reel device being adapted to rotate about its central axis to easily dispense and receive said flexible, non-electrically conducting light transfer path; one end of said flexible, non-electrically conducting light transfer path being connected to a non-rotating surface in spaced relationship with said reel device by means of a swivel coupler, which swivel coupler consists of a swivel body affixed to said non-rotating surface, a terminating ferrule surrounding said flexible, non-electrically conducting light transfer path, and a coupling nut, which coupling nut serves to retain said terminating ferrule in mating relationship with said swivel body, whereby said terminating ferrule and said flexible, non-electrically conducting light transfer path are free to rotate as a unit about the longitudinal axis of said flexible, non-electrically conducting light transfer path and whereby the end of said flexible, non-electrically conducting light transfer path is maintained in a uniform light emitting relationship with a light responsive device mounted in said swivel body.

12. A reel device having a cylindrical body and a central axis; a flexible, non-electrically conducting light transfer path wound on said reel device for storage; said reel device being adapted to rotate about its central axis to easily dispense and receive said flexible, non-electrically conducting light transfer path; one end of said flexible, non-electrically conducting light transfer path being connected to a non-rotating surface in spaced relationship with said reel device by means of a swivel coupler, which swivel coupler consists of a swivel body affixed to said non-rotating surface, a terminating ferrule surrounding said flexible, non-electrically conducting light transfer path, and a coupling nut, which coupling nut serves to retain said terminating ferrule in mating relationship with said swivel body, whereby said terminating ferrule and said flexible, non-electrically conducting light transfer path are free to rotate as a unit about the longitudinal axis of said flexible, non-electrically conducting light transfer path and whereby the end of said flexible, non-electrically conducting light transfer path is maintained in a uniform light receiving relationship with a light emitting device mounted in said swivel body.

13. A method whereby the operator of a movable assembly mounted on a transportable base manipulates the movable assembly by removing a portable control unit from a control box, causing a reel device mounted in a spaced relationship to said control box to dispense a sufficient length of a flexible, non-electrically conducting light transfer path to permit said oprator to seek the most suitable location for manipulating said movable assembly; manipulating said movable assembly by use of a means includes in said portable control unit for controlling and varying the characteristics of a light beam, which light beam is conducted on said flexible, non-electrically conducting light transfer path to a light responsive means mounted in said control box, which light responsive means converts the varying characteristics of said light beam into control signals which cause the movable assembly to respond to the signals initiated by said operator, and upon completion of said desired manipulation of said movable assembly, causing said reel device to retract said flexible, non-electrically conducting light transfer path for storage, and placing said portable control unit in said control box wherein twisting of the flexible, non-electrically conducting light transfer path at the junction of the reel device and the control box is prevented by a swivel coupler, which coupler consists of a swivel body affixed to the control box, said aforementioned light responsive device being mounted in said swivel body; a terminating ferrule surrounding said flexible, non-electrically conducting light transfer path; and a coupling nut, which coupling nut serves to retain said terminating ferrule in mating relationship with said swivel body, whereby said terminating ferrule and said flexible, non-electrically conducting light transfer path are free to rotate as a unit about the longitudinal axis of said flexible, non-electrically conducting light transfer path and whereby the end of said flexible, non-electrically conducting light transfer path is maintained in a uniform light emitting relationship to said light responsive device.

14. A method whereby the operator of a movable beam device for moving objects mounted on a vehicle body moves said movable beam assembly by taking a control means in his hand, unwinding a length of flexible, non-electrically conducting light transfer means from a reel device mounted in spaced relationship to a control box installed on said vehicle body, moving said movable beam assembly by manipulating control switches included in said control means, rewinding said flexible, non-electrically conducting light transfer means on said reel device, and returning said control means to said vehicle body wherein twisting of the flexible, non-electrically conducting light transfer means at the junction of the reel device and the control box is prevented by a swivel coupler, which coupler consists of a swivel body affixed to the control box, a light responsive device mounted in said swivel body, a terminating ferrule surrounding said flexible, non-electrically conducting light transfer means, and a coupling nut, which coupling nut serves to retain said terminating ferrule in mating relationship with said swivel body, whereby said terminating ferrule and said flexible, non-electrically conducting light transfer means are free to rotate as a unit about the longitudinal axis of said flexible, non-electrically conducting light transfer means and whereby the end of said flexible, non-electrically conducting light transfer means is maintained in a uniform light emitting relationship to said light responsive device.

15. A method whereby the operator of a crane controls said crane by removing a length of fiber optic cable with a portable hand held control device on its free end from a reel device mounted in spaced relationship to a control box installed on said crane, placing said hand held portable control device in his hand, and positioning himself at a location most suitable for operating said crane, operating said crane by generating light signals with said hand held portable control device, returning said portable hand held control device to a location adjacent to said reel device, and causing said reel device to receive and store said length of said fiber optic cable previously removed from said reel device wherein twisting of the fiber optic cable at the junction of the reel device and the control box is prevented by a swivel coupler, which coupler consists of a swivel body affixed to the control box, a light responsive device mounted in said swivel body; a terminating ferrule surrounding said fiber optic cable; and a coupling nut, which coupling nut serves to retain said terminating ferrule in mating relationship with said swivel body, whereby said terminating relationship with said swivel body, whereby said terminating ferrule and said fiber optic cable are free to rotate as a unit about the longitudinal axis of said fiber optic cable and whereby the end of said fiber optic cable is maintained in a uniform light emitting relationship to said light responsive device.

* * * * *